US011700382B1

(12) United States Patent
Chaudhari et al.

(10) Patent No.: US 11,700,382 B1
(45) Date of Patent: Jul. 11, 2023

(54) SYSTEMS AND METHODS FOR IMPROVING MODE DECISIONS IN HARDWARE VIDEO ENCODERS

(71) Applicant: Meta Platforms, Inc., Menlo Park, CA (US)

(72) Inventors: Gaurang Chaudhari, Sunnyvale, CA (US); Yunqing Chen, Los Altos, CA (US); Harikrishna Madadi Reddy, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/518,543

(22) Filed: Nov. 3, 2021

(51) Int. Cl.
*H04N 19/147* (2014.01)
*H04N 19/436* (2014.01)
*H04N 19/184* (2014.01)
*H04N 19/107* (2014.01)

(52) U.S. Cl.
CPC ......... *H04N 19/147* (2014.11); *H04N 19/107* (2014.11); *H04N 19/184* (2014.11); *H04N 19/436* (2014.11)

(58) Field of Classification Search
CPC .. H04N 19/147; H04N 19/107; H04N 19/184; H04N 19/436
See application file for complete search history.

(56) References Cited

U.S. PATENT DOCUMENTS

| 2011/0200101 | A1* | 8/2011 | Zan | H04N 19/194 |
| | | | | 375/240.03 |
| 2014/0219349 | A1* | 8/2014 | Chien | H04N 19/433 |
| | | | | 375/240.12 |
| 2016/0261870 | A1* | 9/2016 | Tu | H04N 19/109 |
| 2019/0281302 | A1* | 9/2019 | Zhang | H04N 19/176 |
| 2020/0186810 | A1* | 6/2020 | Zheludkov | H04N 19/176 |

* cited by examiner

*Primary Examiner* — Tracy Y. Li
(74) *Attorney, Agent, or Firm* — Greenberg Traurig, LLP (57) ABSTRACT

An example disclosed system may include a hardware video encoding pipeline (HVEP), the HVEP that includes a prediction module that generates, using a primary prediction mode, a primary encode of a portion of a video stream, and using a secondary prediction mode, a secondary encode of the portion of the video stream. The HVEP may also include (1) a rate-distortion optimization (RDO) module that determines a primary cost associated with the primary encode and a secondary cost associated with the secondary encode, (2) a quality metric (QM) module that determines a primary QM associated with the primary encode and a secondary QM associated with the secondary encode, and (3) a decision module that selects, for an encoding of the video stream, at least one of the primary prediction mode and the secondary prediction mode based on the primary cost, the secondary cost, the primary QM, and the secondary QM.

20 Claims, 5 Drawing Sheets

SYSTEMS AND METHODS FOR IMPROVING MODE DECISIONS IN HARDWARE VIDEO ENCODERS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Modern video encoding standards, such as Advanced Video Coding (AVC)/H.264, High Efficiency Video Codec (HEVC)/H.265, AOMedia Video 1 (AV1), VP9, and so forth are generally based on hybrid coding frameworks that may compress video data by exploiting redundancies within the video data. Compression may be achieved by identifying and storing only differences within the video data, such as may occur between temporally proximate frames (i.e., inter-frame coding) and/or between spatially proximate pixels (i.e., intra-frame coding). Inter-frame compression uses data from one or more earlier or later frames in a sequence to describe a current frame. Intra-frame coding, on the other hand, uses only data from within the current frame to describe the current frame.

Modern video encoding standards may additionally employ compression techniques like quantization that may exploit perceptual features of human vision, such as by eliminating, reducing, and/or more heavily compressing aspects of source video data that may be less relevant to human visual perception than other aspects. For example, as human vision may generally be more sensitive to changes in brightness than changes in color, a video encoder using a particular video codec may use more data on average to encode changes in luminance than changes in color. In all, video encoders must balance various trade-offs between video quality, bit rate, processing costs, and/or available system resources to effectively encode and/or decode video data.

Conventional or traditional methods of making encoding decisions may involve simply choosing a result that yields the highest quality output image according to some quality standard. However, such methods may choose settings that may require more bits to encode video data while providing comparatively little quality benefit. As an example, during a motion estimation portion of an encoding process, adding extra precision to representation of motion vectors of blocks might increase quality of an encoded output video, but the increase in quality might not be worth the extra bits necessary to encode the motion vectors with a higher precision.

As an additional example, during a basic encoding process, an encoder may divide each frame of video data into processing units. Depending on the codec, these processing units may be referred to as macroblocks (MB), coding units (CU), coding tree units (CTU), and so forth. Modern codecs may select a particular mode (i.e., a processing unit size and/or shape) from among several available modes for encoding video data. This mode decision may greatly impact an overall rate-distortion result for a particular output video file. Mode decision may be one of the computationally complex operations included in a conventional video encoding pipeline and may have a significant impact on the quality of encoded video data. Furthermore, new codecs with possibly higher quality versus compression trade-offs may also require more computing resources to search through more possible modes. For example, in VP9, there may be a recursive four-way partition from sixty-four pixels by sixty-four pixels down to four pixels by four pixels whereas, in an AV1 video encoding standard, there may be a ten-way partition from 128×128 pixels down to four by four pixels.

In conventional mode decision hardware, the mode decision module (e.g., a decision block or module included as part of the mode decision module) may choose a "best" mode based on a bit rate rate-distortion cost (rdcost) value. In one example expression of these concepts, the bit rate cost R and distortion cost D may be combined into a single cost J:

$$J = D + \lambda R$$

However, this conventional use of an rdcost to choose a mode may be inflexible, and hence may not allow prioritization of alternative quality metrics (QM) during mode decision. This may limit an ability of such hardware video encoding pipelines to produce encoding results that may improve on or prioritize other quality metrics.

By way of illustration, during a mode decision process, a conventional mode decision module may store a first rdcost value (e.g., corresponding to a first evaluated mode). The mode decision module may subsequently replace the rdcost value if a new rdcost value corresponding to a second rdcost value represents a more advantageous rdcost than the first rdcost value. After the mode decision module has evaluated all the modes, the most advantageous rdcost will be stored and selected.

Some conventional ways of tuning for a quality metric may include changing how a system determines distortion (D) and/or choosing a different value for λ when evaluating rdcost. Unfortunately, derivation of suitable values for λ may be a complicated and/or complex process and may involve inexact approximations and/or dependence on empirical values that may not be readily available. Hence, the instant application identifies and addresses a need for new systems and methods for improving mode decisions in hardware video encoders.

The present disclosure is generally directed to systems and methods for improving mode decisions in hardware video encoders. As will be explained in greater detail below, embodiments of the instant disclosure may include a prediction module that generates, using a primary prediction mode, a primary encode of a portion of a video stream. In some examples, the prediction module may further generate, using a secondary prediction mode, a secondary encode of the portion of the video stream. The hardware video encoding pipeline may further include a rate-distortion optimization (RDO) module that determines a primary cost associated with the primary encode and a secondary cost associated with the secondary encode. The hardware video encoding pipeline may also include a quality metric (QM) module that determines a primary QM associated with the primary encode and a secondary QM associated with the secondary encode. Additionally, the hardware video encoding pipeline may include a decision module that selects, for an encoding of the video stream, at least one of the primary prediction mode and the secondary prediction mode based on the primary cost, the secondary cost, the primary QM, and the secondary QM.

By storing multiple candidate costs and QMs corresponding to different prediction modes, the systems and methods described herein may prioritize selection of a prediction mode based on QM or rdcost. This may introduce improved flexibility in mode decision and may enable the hardware video encoding pipeline to produce video encodes with improved metrics (e.g., Bjontegard metrics, also known as BD-rates) for a particular QM.

The following will provide, with reference to FIGS. 1-4, detailed descriptions of systems for improving mode decisions in hardware video encoders. Detailed descriptions of corresponding computer-implemented methods will also be provided in connection with FIG. 5.

Figure 1:
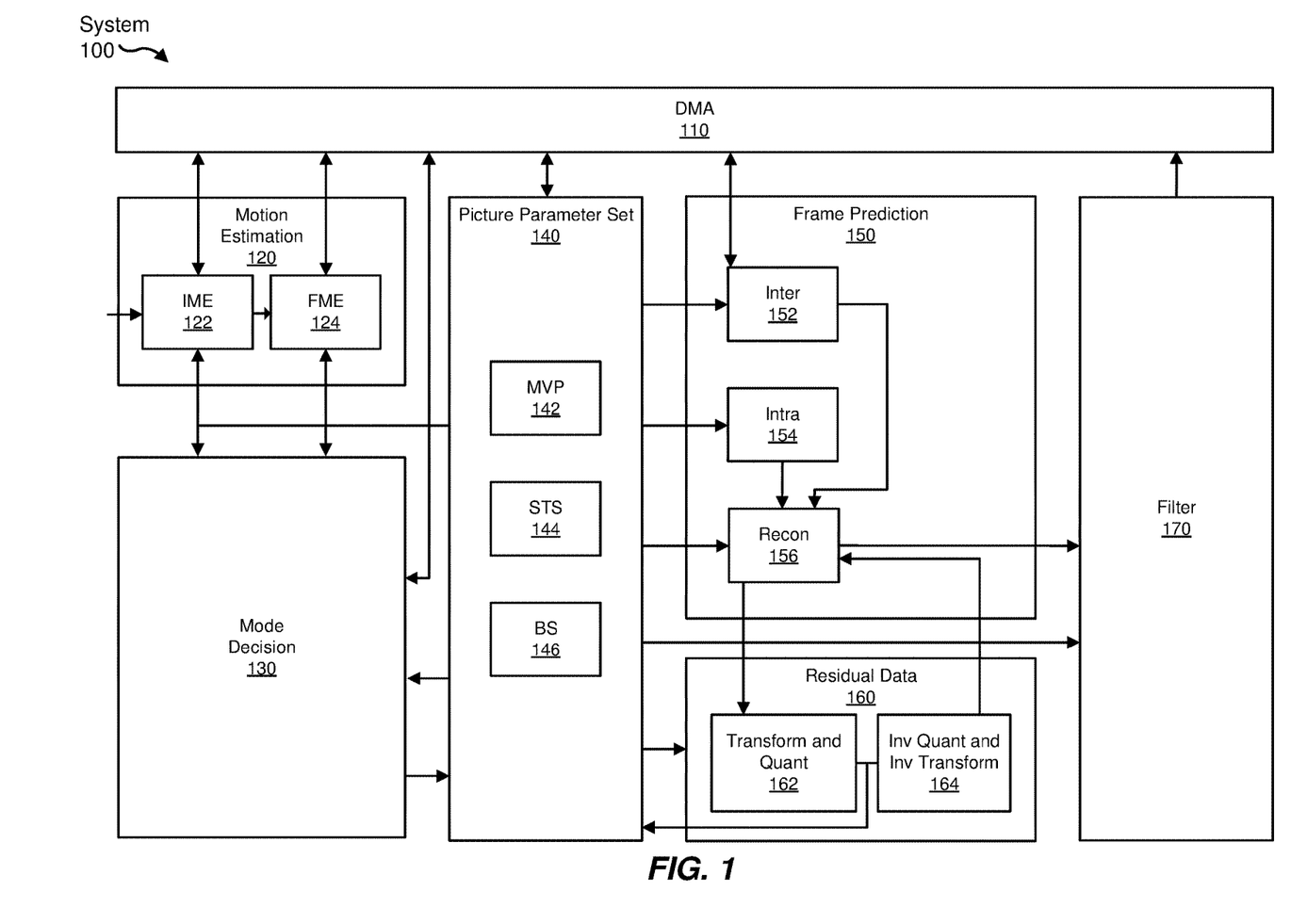
FIG. 1 is a block diagram of an example hardware video encoding pipeline in accordance with some embodiments described herein.

FIG. 1 is a block diagram of an example hardware video encoding pipeline (system 100) that may support tuning of a quality metric in mode decision as described herein. The hardware video encoding pipeline may support a video encoding standard such as, without limitation, AVC/H.264, HEVC/H.265, VP9, AV1, and so forth. The blocks and/or modules included in FIG. 1 may illustrate procedures, tasks, and/or processes that may be executed by one or more portions of the video encoding pipeline to support encoding of video data in accordance with a video encoding standard supported by the video encoding pipeline. One or more of these modules may also represent all or portions of one or more special-purpose electronic devices (i.e., hardware devices) configured to perform one or more tasks.

As shown, system 100 may include a direct memory access module 110 (DMA 110) that may store and/or access any suitable video data for encoding by the video encoding pipeline. Additionally, system 100 may include a motion estimation block 120 that may perform one or more tasks to determine one or more motion vectors that may describe a transformation from one video frame to another video frame. Motion estimation block 120 may access and/or generate integer motion estimation data (IME 122) and/or fractional motion estimation data (FME 124) and may communicate that motion estimation data to mode decision block 130. Mode decision block 130 may, as will be described in greater detail below, perform one or more tasks to select, identify, and/or determine a suitable mode for encoding of video data. As described herein, mode decision block 130 may support tuning of a quality metric for one or more mode decision processes.

As further shown in FIG. 1, system 100 may also include and/or may access a picture parameter set (PPS) 140 (PPS 140). In some examples, PPS 140 may include information that may be useful for encoding video data, such as a resolution of video data, a frame rate of video data, and so forth. In some examples, PPS 140 may include one or more parameters that may apply to encoding and/or decoding of one or more individual pictures inside a coded video sequence. For example, as shown in FIG. 1, PPS 140 may include, without limitation, motion vector prediction data 142 (MVP 142), status data 144 (STS 144), and/or boundary strength data 146 (BS 146).

At frame prediction 150, one or more processes may be applied to video data to predict one or more portions of video data. As shown, frame prediction 150 may include inter-prediction 152 (inter 152), intra-prediction 154 (intra 154), and reconstruction 156 (recon 156). Inter 152 may represent one or more processes that may predict changes between frames of video data and intra 154 may represent one or more processes that may predict changes within a frame of video data. Reconstruction 156 may represent one or more processes that may reconstruct video data from intra-predicted and/or intra-predicted video data.

At residual data 160, one or more processes may be applied to determine, analyze, and/or encode residual frame data. In some video encoding algorithms, residual data (also referred to as "residual frames" or "residual frame data") may be formed by subtracting a reference frame from a desired frame. This residual data may have less information entropy, due to nearby video frames having similarities, and therefore may require fewer bits to compress. The residual data may then be transformed and/or quantized in accordance with a video encoding standard (e.g., at "transform and quant 162") and/or inversely quantized and inversely transformed in accordance with the video encoding standard (e.g., at "inv quant and inv transform 164"). At filter 170, one or more video filters (e.g., deblocking filters) may be applied to video data.

Figure 2:
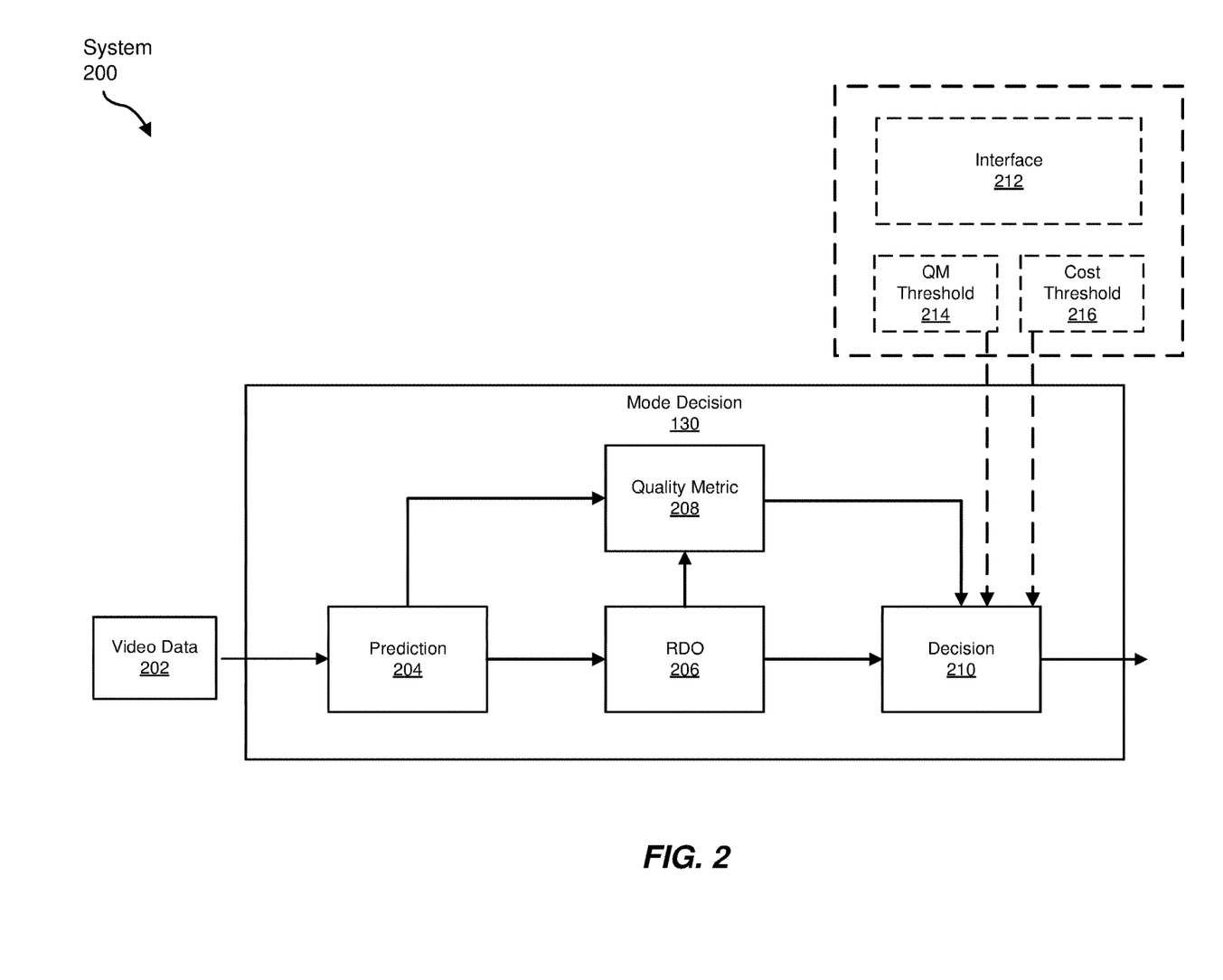
FIG. 2 is a block diagram of a mode decision module that supports tuning of a quality metric for mode decision in accordance with some embodiments described herein.

FIG. 2 is a block diagram of an example system 200 that may illustrate a mode decision system that supports tuning of a quality metric in mode decision described herein. Example system 200 may be included in a hardware video encoding pipeline such as illustrated in FIG. 1 (e.g., as mode decision 130). As shown, mode decision module 130 receives video data 202 for a mode decision operation. In some examples, video data 202 may include motion estimation data, frame data, block-level video data, and so forth.

Example system 200 further includes a prediction module 204 (prediction 204). In some examples, prediction module 204 may select a primary prediction mode. Prediction module 204 may then generate a primary encode of a portion of a video stream (e.g., video data 202). Prediction module 204 may then pass the primary encode to rate-distortion optimization (RDO) module 206 and quality metric (QM) module 208.

RDO 206 may determine a primary cost (e.g., an rdcost) associated with encoding video data using the primary prediction mode (e.g., in accordance with an RDO process supported by the video encoding standard). Likewise, QM module 208 may determine a primary QM associated with the primary encode. In some examples a quality metric may include any suitable metric of video encoding quality including, without limitation, a structural similarity index measure (SSIM) a multi-scale SSIM an overall peak signal-to-noise ratio (PSNR), an averaged PSNR, a variance inflation factor (VIF), a motion-based video integrity evaluation (MOVIE) index, a naturalness image quality evaluator (NIQE), a video multimethod assessment fusion (VMAF), and/or a blind/referenceless image spatial quality evaluation (BRISQUE). RDO module 206 and QM module 208 may respectively pass the primary cost and the primary QM to decision module 210.

Continuing with this example, prediction module 204 may select a secondary prediction mode. Prediction module 204 may then generate a secondary encode of the portion of the video stream. Prediction module 204 may then pass the secondary encode to RDO module 206 and QM module 208. RDO 210 may determine a secondary cost (e.g., an rdcost) associated with encoding video data using the secondary prediction mode (e.g., in accordance with an RDO process supported by the video encoding standard). Likewise, QM module 208 may determine a secondary QM associated with the primary encode. RDO module 206 and QM module 208 may respectively pass the secondary cost and the secondary QM to decision module 210.

Figure 3:
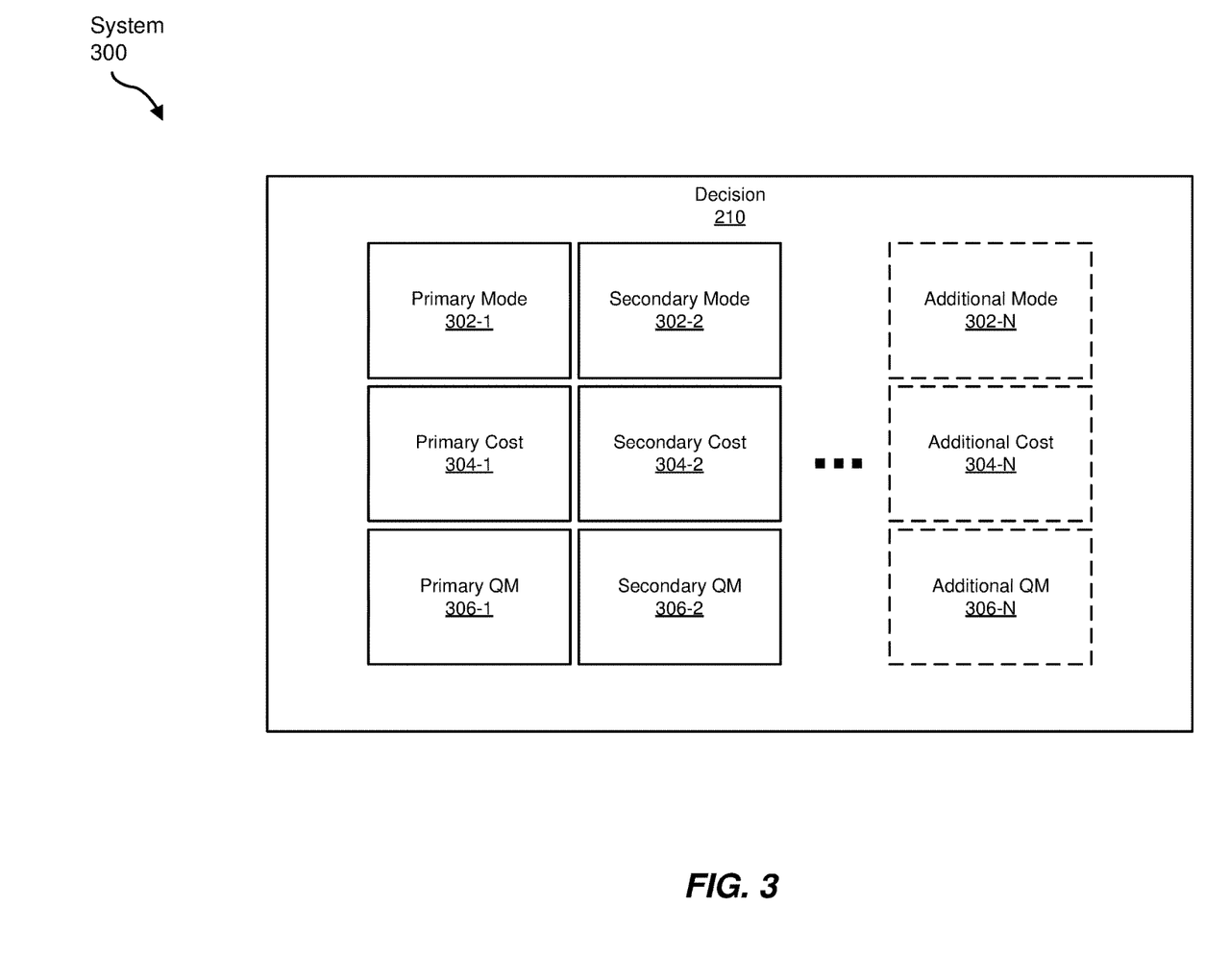
FIG. 3 is a block diagram of a decision module included in a mode decision module that supports tuning of a quality metric for mode decision in accordance with some embodiments described herein.

FIG. 3 is a block diagram of decision module 210. As shown, decision module 210 may store (e.g., within a data storage device included in and/or accessible to decision module 210) data associated with a primary mode 302-1 and a secondary mode 302-2. As shown, primary mode 302-1 may be associated with a primary cost 304-1 and a primary QM 306-1, while secondary mode 302-2 may be associated with a secondary cost 304-2 and a secondary QM 306-2. As also shown in FIG. 3, in some examples, decision module 210 may store additional costs and additional QMs associated with additional modes, as indicated by additional mode 302-N, additional cost 304-N, and additional QM 306-N. Note that FIG. 3 is merely illustrative in nature and is not intended to limit the scope of the present disclosure.

As a mode decision process continues, and as mode decision module 130 evaluates more prediction modes, decision module 210 may replace stored values such that only the most desirable N values are stored within decision module 210. For example, decision module 210 may receive a test cost from RDO module 206 and a test QM from QM module 208. The test cost and the test QM may be associated with a test prediction mode. Decision module 210 may determine that the test QM differs from the primary QM by less than the secondary QM differs from the primary QM. Consequently, decision module 210 may replace the secondary QM with the test QM and the secondary cost with the test cost.

Once mode decision module 130 has evaluated all suitable prediction modes, decision module 210 may select, for an encoding of the video stream, at least one of the primary prediction mode and the secondary prediction mode based on the primary cost, the secondary cost, the primary QM, and the secondary QM. In some examples, decision module 210 may select the primary prediction mode and/or the secondary prediction mode by determining that the primary QM differs from the secondary QM by at least a QM threshold value. Hence, decision module 210 may select the prediction mode having an advantageous QM value.

In additional examples, decision module 210 may select the primary prediction mode and/or the secondary prediction mode by determining that the primary cost differs from the secondary cost by less than a cost threshold value. In this way, the system may select for the more advantageous rdcost in some situations, such as if the difference between the QM values does not reach a predetermined threshold.

In some examples, the cost threshold and/or the QM threshold may be programmable. Hence, as shown in FIG. 2, some embodiments of system 200 may include an interface 212. Interface 212 may include any suitable user interface, computing interface, and/or a machine interface that may enable a user, a computing device, and/or a machine to direct decision module 210 to use a programmable QM threshold value (e.g., QM threshold 214) and/or a programmable cost threshold (e.g., cost threshold 216).

Figure 4:
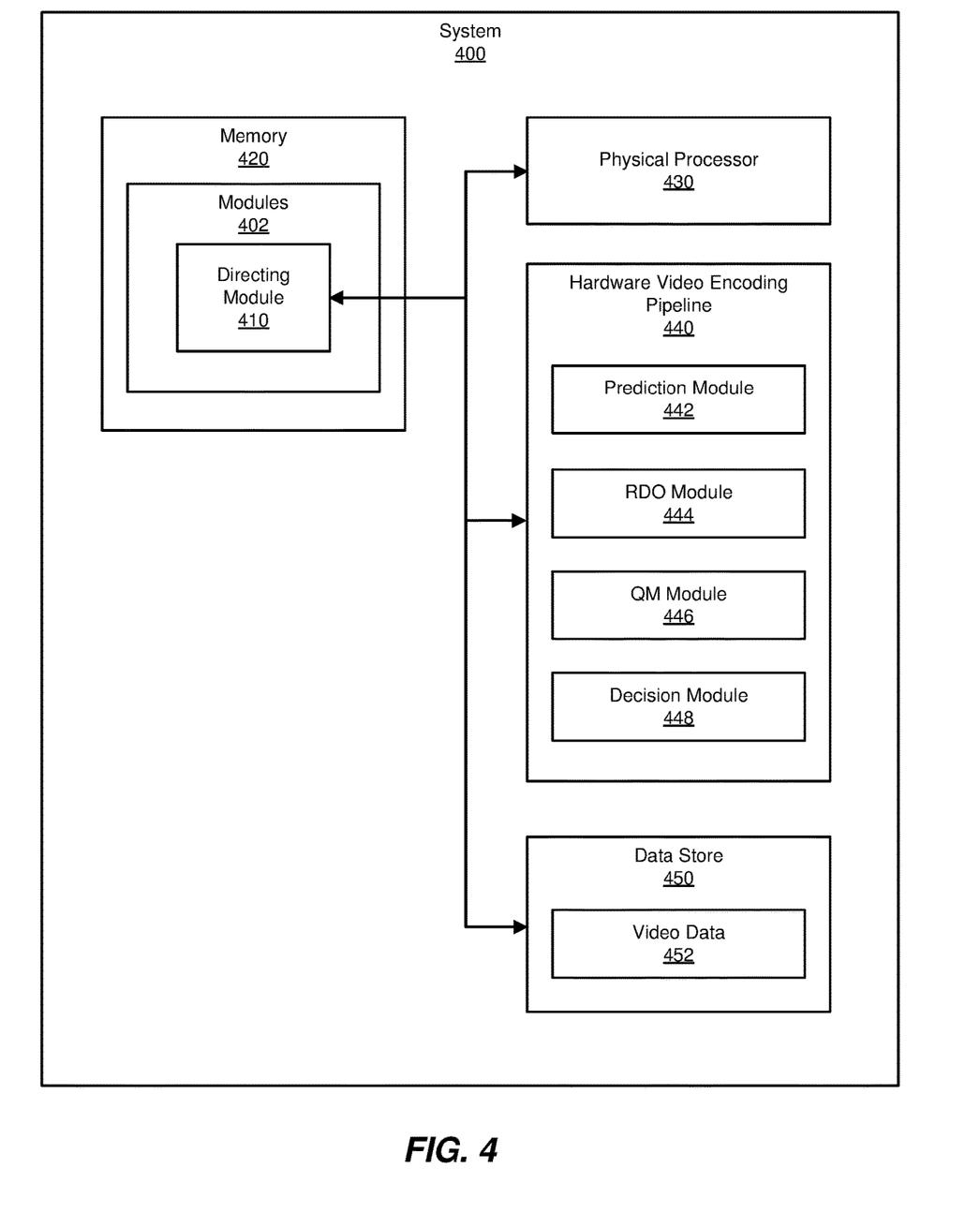
FIG. 4 is a block diagram of an example system for improving mode decisions in hardware video encoders as described herein.

FIG. 4 is a block diagram of an example system 400 for improving mode decisions in hardware video encoders. As illustrated in this figure, example system 400 may include one or more modules 402 for performing one or more tasks. In some examples, modules 402 may be included in and/or incorporated as part of one or more control units included in a hardware video encoding pipeline. As will be explained in greater detail below, modules 402 may include a directing module 410 that may direct a prediction module (e.g., prediction module 442), included in a hardware video encoding pipeline (e.g., hardware video encoding pipeline 440), to generate, using a primary prediction mode, a primary encode of a portion of a video stream. Directing module 410 may also direct the prediction module to generate, using a secondary prediction mode, a secondary encode of the portion of the video stream.

Additionally, directing module 410 may also direct an RDO module (e.g., RDO module 444), included in the hardware video encoding pipeline, to determine a primary cost associated with the primary encode and a secondary cost associated with the secondary encode. Directing module 410 may further direct a QM module, included in the hardware video encoding pipeline, to determine a primary QM associated with the primary encode and a secondary QM associated with the secondary encode.

Moreover, directing module 410 may direct a decision module (e.g., decision module 448), included in the hardware video encoding pipeline, to select at least one of the primary prediction mode and the secondary prediction mode based on the primary cost, the secondary cost, the primary QM, and the secondary QM.

As further illustrated in FIG. 4, example system 400 may also include one or more memory devices, such as memory 420. Memory 420 generally represents any type or form of volatile or non-volatile storage device or medium capable of storing data and/or computer-readable instructions. In one example, memory 420 may store, load, and/or maintain one or more of modules 402. Examples of memory 420 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

Also shown in FIG. 4, example system 400 may also include one or more physical processors, such as physical processor 430. Physical processor 430 generally represents any type or form of hardware-implemented processing unit capable of interpreting and/or executing computer-readable instructions. In one example, physical processor 430 may access and/or modify one or more of modules 402 stored in memory 420. Additionally or alternatively, physical processor 430 may execute one or more of modules 402 to facilitate improving mode decisions in hardware video encoders. Examples of physical processor 430 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

FIG. 4 also shows that example system 400 may further include a hardware video encoding pipeline 440. Hardware video encoding pipeline 440 may include a prediction module 442, an RDO module 444, a QM module 446, and a decision module 448. Prediction module 442 may, like prediction module 204 in FIG. 2, be configured to select prediction modes and/or generate encodes of video data in accordance with selected prediction modes. RDO module 444, like RDO module 206 in FIG. 2, may be configured to determine costs (e.g., an rdcost) associated with encoding video data in accordance with a selected prediction mode. QM module 446, like QM module 208 in FIG. 2, may be configured to determine one or more quality metrics associated with encodes of video data. Decision module 448 may, like decision module 210, be configured to select a prediction mode from a plurality of prediction modes based on costs and quality metrics associated with the prediction modes.

As also shown in FIG. 4, example system 400 may further include one or more data stores, such as data store 450, that may receive, store, and/or maintain data. data store 450 may represent portions of a single data store or computing device or a plurality of data stores or computing devices. In some embodiments, data store 450 may be a logical container for data and may be implemented in various forms (e.g., a database, a file, a file system, a data structure, etc.). Examples of data store 450 may include, without limitation, files, file systems, data stores, databases, and/or database management systems such as an operational data store (ODS), a relational database, a No SQL database, a NewSQL database, and/or any other suitable organized collection of data. In at least one example, data store 450 may include (e.g., store, host, access, maintain, etc.) video data 452 that may include and/or represent any video data and/or associated parameters, values, data, and so forth that may be used in a video encoding process supported by hardware video encoding pipeline 440.

Figure 5:
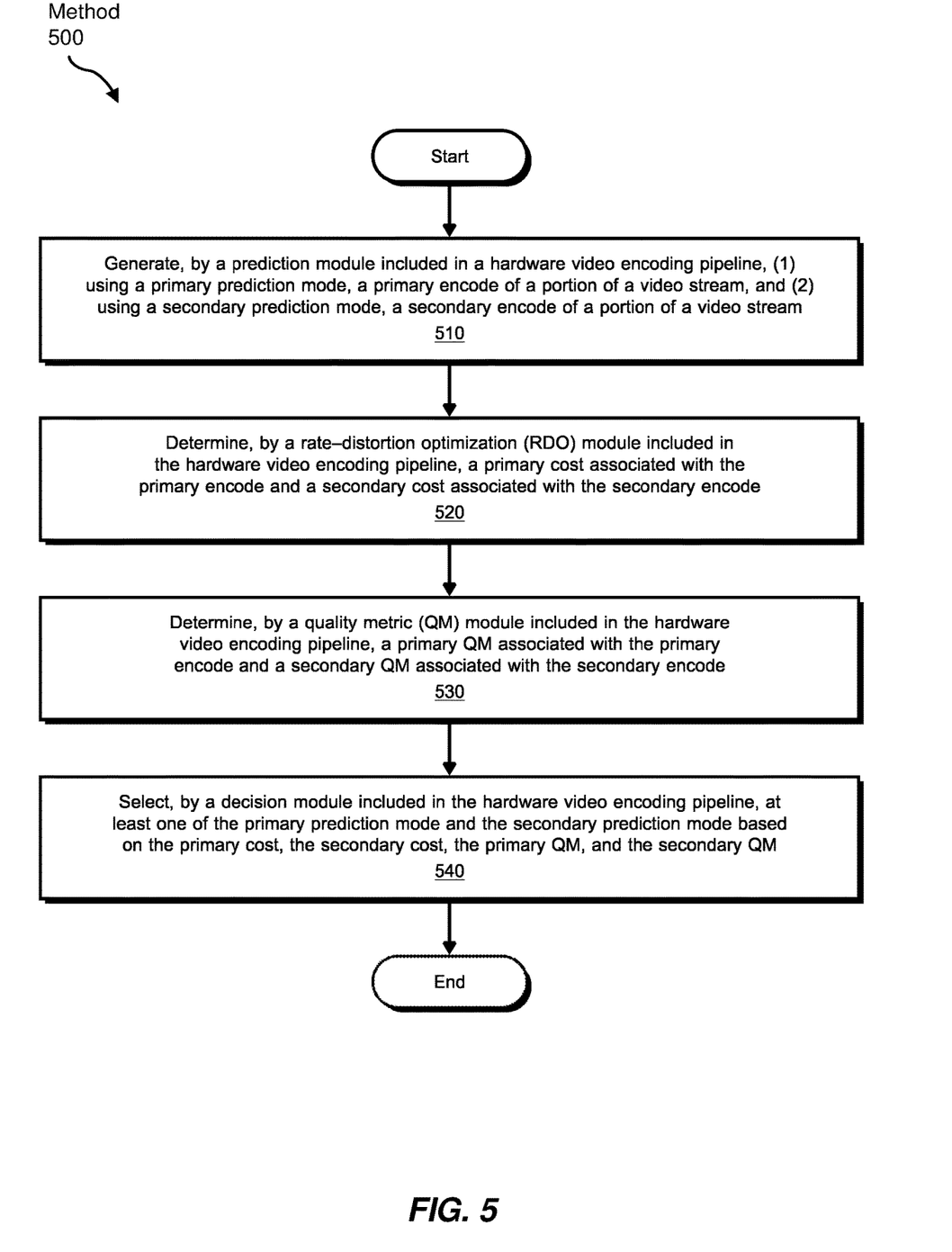
FIG. 5 is a flow diagram of an example method for improving mode decisions in hardware video encoders.

FIG. 5 is a flow diagram of an example computer-implemented method 500 for improving mode decisions in hardware video encoders. The steps shown in FIG. 5 may be performed by any suitable computer-executable code and/or computing system, including any of systems 100 to 400 in FIGS. 1 to 4 and/or variations or combinations of one or more of the same. In one example, each of the steps shown in FIG. 5 may represent an algorithm whose structure includes and/or is represented by multiple sub-steps, examples of which may be provided in greater detail herein.

As illustrated in FIG. 5, at step 510, one or more of the systems described herein may generate (1) using a primary prediction mode, a primary encode of a portion of a video stream, (2) using a secondary prediction mode, a secondary encode of a portion of a video stream. For example, prediction module 204 may generate (1) using primary prediction mode 302-1, a primary encode of a portion of video data 202, and (2) using secondary prediction mode 302-1, a secondary encode of the portion of video data 202. This may be accomplished in any of the ways described herein. For example, prediction module 204 may include specialized hardware (e.g., a specialized processing device) included in a hardware video encoding pipeline (e.g., system 100) configured to generate (1) using primary prediction mode 302-1, a primary encode of a portion of video data 202, and (2) using secondary prediction mode 302-1, a secondary encode of the portion of video data 202 upon receiving video data 202. Additionally or alternatively, directing module 410 may, when executed by physical processor 430, direct prediction module 442 to generate (1) the primary encode of the portion of video data 452, and (2) the secondary encode of the portion of video data 452.

At step 520, one or more of the systems described herein may determine a primary cost associated with the primary encode and a secondary cost associated with the secondary encode. For example, RDO module 206 may determine primary cost 304-1 associated with the primary encode and secondary cost 304-2 associated with the secondary encode. This may be accomplished in any of the ways described herein. For example, RDO module 206 may include specialized hardware (e.g., a specialized processing device) included in a hardware video encoding pipeline (e.g., system 100) configured to determine primary cost 304-1 associated with the primary encode and secondary cost 304-2 associated with the secondary encode upon receiving prediction data from prediction module 204. Additionally or alternatively, directing module 410 may, when executed by physical processor 430, direct RDO module 444 included in hardware video encoding pipeline 440 to determine primary cost 304-1 associated with the primary encode and secondary cost 304-2 associated with the secondary encode.

At step 530, one or more of the systems described herein may determine a primary QM associated with the primary encode and a secondary QM associated with the secondary encode. For example, QM module 208 may determine primary QM 306-1 associated with the primary encode and secondary QM 306-2 associated with the secondary encode. This may be accomplished in any of the ways described herein. For example, QM module 208 may include specialized hardware (e.g., a specialized processing device) included in a hardware video encoding pipeline (e.g., system 100) configured to determine primary QM 306-1 and secondary QM 306-2 upon receiving prediction data from prediction module 204 and cost data from RDO module 206. Additionally or alternatively, directing module 410 may, when executed by physical processor 430, direct QM module 446 included in hardware video encoding pipeline 440 to determine primary QM 306-1 associated with the primary encode and secondary QM 306-2 associated with the secondary encode.

At step 540, one or more of the systems described herein may select at least one of the primary prediction mode and the secondary prediction mode based on the primary cost, the secondary cost, the primary QM, and the secondary QM. For example, decision module 210 may select at least one of primary prediction mode 302-1 and secondary prediction mode 302-2 based on primary cost 304-1, secondary cost 304-2, primary QM 306-1, and secondary QM 306-2. This may be accomplished in any of the ways described herein. For example, decision module 210 may include specialized hardware (e.g., a specialized processing device) included in a hardware video encoding pipeline (e.g., system 100) configured to select at least one of primary prediction mode 302-1 and secondary prediction mode 302-2 based on primary cost 304-1, secondary cost 304-2, primary QM 306-1, and secondary QM 306-2 upon receiving all of the foregoing data from RDO module 206 and QM module 208. Additionally or alternatively, directing module 410 may, when executed by physical processor 430, direct decision module 448 to select at least one of primary prediction mode 302-1 and secondary prediction mode 302-2 based on primary cost 304-1, secondary cost 304-2, primary QM 306-1, and secondary QM 306-2.

As discussed throughout the instant disclosure, the disclosed systems and methods may provide one or more advantages over traditional options for mode decision. The flexible architecture described herein may tune for a particular objective QM. The architecture described herein adds a block level QM calculation module that computes the QM value for a particular partition. The decision module (e.g., decision module 210 and/or decision module 448) may receive the rdcost values for all the modes along with corresponding QM values for all the modes. Now, instead of storing a single best value, the decision module may store a plurality of (e.g., the top N best) rdcost candidates. For each of these candidates, the decision module may also store a corresponding QM value. After evaluation of all relevant modes, the decision module may select a prediction mode having a second best rdcost if the QM value of the prediction mode is advantageous. The system may also define, receive, and/or use a threshold of deviation of rdcost value. This way, the systems and methods described herein may tune for the QM without strongly deviating from the best rdcost. In some examples, the QM and rdcost thresholds may be programmable.

Hence, the systems and methods described herein may prioritize selection of a prediction mode based on QM or rdcost. This may introduce improved flexibility in mode decision and may enable the hardware video encoding pipeline to produce video encodes with improved BD-rates for a particular QM.

EXAMPLE EMBODIMENTS

Example 1: A system comprising a hardware video encoding pipeline, the hardware video encoding pipeline comprising (1) a prediction module that generates, (a) using a primary prediction mode, a primary encode of a portion of a video stream, and (b) using a secondary prediction mode, a secondary encode of the portion of the video stream, (2) a rate-distortion optimization (RDO) module that determines a primary cost associated with the primary encode and a secondary cost associated with the secondary encode, (3) a quality metric (QM) module that determines a primary QM associated with the primary encode and a secondary QM associated with the secondary encode, and (4) a decision module that selects, for an encoding of the video stream, at least one of the primary prediction mode and the secondary prediction mode based on the primary cost, the secondary cost, the primary QM, and the secondary QM.

Example 2: The system of example 1, wherein the decision module selects at least one of the primary prediction mode and the secondary prediction mode by determining that the primary QM differs from the secondary QM by at least a QM threshold value.

Example 3: The system of example 2, wherein the QM module receives the QM threshold value via a programmable interface.

Example 4: The system of any of examples 2 and 3, wherein the decision module further selects at least one of the primary prediction mode and the secondary prediction mode by determining that the primary cost differs from the secondary cost by less than a cost threshold value.

Example 5: The system of example 4, wherein the decision module receives the cost threshold value via a programmable interface.

Example 6: The system of any of examples 1-5, wherein the decision module selects at least one of the primary prediction mode and the secondary prediction mode by storing the primary cost, the secondary cost, the primary QM, and the secondary QM within a data storage device accessible to the decision module.

Example 7: The system of example 6, wherein the decision module further (1) receives, (a) from the RDO module, a test cost associated with a test prediction mode, and (b) from the QM module, a test QM associated with the test prediction mode, (2) determines that the test QM differs from the primary QM by less than the secondary QM differs from the primary QM, and (3) replaces the secondary QM with the test QM and the secondary cost with the test cost based on determining that the test QM differs from the primary QM by more than a threshold QM value.

Example 8: The system of any of examples 1-7, wherein the QM comprises at least one of (1) a structural similarity index measure (SSIM), (2) a multi-scale SSIM, (3) an overall peak signal-to-noise ratio (PSNR), (4) an averaged PSNR, (5) a variance inflation factor (VIF), (6) a motion-based video integrity evaluation (MOVIE) index, (7) a naturalness image quality evaluator (NIQE), (8) a video multimethod assessment fusion (VMAF), or (9) a blind/referenceless image spatial quality evaluation (BRISQUE).

Example 9: The system of any of examples 1-8, wherein the primary prediction mode and the secondary prediction mode are included in a set of prediction modes supported by a video encoding standard, the video encoding standard comprising at least one of (1) an Advanced Video Coding (AVC)/H.264 video encoding standard, (2) a High Efficiency Video Coding (HEVC)/H.265 video encoding standard, (3) a VP9 video encoding standard, or (4) an AOMedia Video 1 (AV1) video encoding standard.

Example 10: The system of any of examples 1-9, wherein at least one of the primary prediction mode and the secondary prediction mode comprises an inter prediction partition mode.

Example 11: The system of any of examples 1-10, wherein at least one of the primary prediction mode and the secondary prediction mode comprises an intra prediction mode.

Example 12: The system of any of examples 1-11, wherein at least one of the primary prediction mode and the secondary prediction mode comprises at least one of (1) a luma prediction mode, or (2) a chroma prediction mode.

Example 13: A computer-implemented method comprising (1) generating, by a prediction module included in a hardware video encoding pipeline, (a) using a primary prediction mode, a primary encode of a portion of a video stream, (b) using a secondary prediction mode, a secondary encode of a portion of a video stream, (2) determining, by a rate-distortion optimization (RDO) module included in the hardware video encoding pipeline, a primary cost associated with the primary encode and a secondary cost associated with the secondary encode, (3) determining, by a quality metric (QM) module included in the hardware video encoding pipeline, a primary QM associated with the primary encode and a secondary QM associated with the secondary encode, and (4) selecting, by a decision module included in the hardware video encoding pipeline, at least one of the primary prediction mode and the secondary prediction mode based on the primary cost, the secondary cost, the primary QM, and the secondary QM.

Example 14: The computer-implemented method of example 13, wherein selecting at least one of the primary prediction mode and the secondary prediction mode comprises determining that the primary QM differs from the secondary QM by at least a QM threshold value.

Example 15: The computer-implemented method of example 14, further comprising receiving the QM threshold value via a programmable interface.

Example 16: The computer-implemented method of any of examples 14 and 15, wherein selecting at least one of the primary prediction mode and the secondary prediction mode comprises determining that the primary cost differs from the secondary cost by less than a cost threshold value.

Example 17: The computer-implemented method of example 16, further comprising receiving the cost threshold value via a programmable interface.

Example 18: The computer-implemented method of any of examples 13-17, wherein (1) selecting at least one of the primary prediction mode and the secondary prediction mode comprises storing the primary cost, the secondary cost, the primary QM, and the secondary QM within a data storage device accessible to the decision module, and (2) the computer-implemented method further comprises (a) receiving, (i) from the RDO module, a test cost associated with a test prediction mode, and (ii) from the QM module, a test QM associated with the test prediction mode, (b) determining that the test QM differs from the primary QM by less than the secondary QM differs from the primary QM, and (c) replacing the secondary QM with the test QM and the secondary cost with the test cost based on determining that the test QM differs from the primary QM by more than a threshold QM value.

Example 19: A non-transitory computer-readable medium comprising computer-readable instructions that, when executed by at least one processor of a computing system, cause the computing system to direct (1) a prediction module, included in a hardware video encoding pipeline, to generate, (a) using a primary prediction mode, a primary encode of a portion of a video stream, and (b) using a secondary prediction mode, a secondary encode of the portion of the video stream, (2) a rate-distortion optimization (RDO) module, included in the hardware video encoding pipeline, to determine a primary cost associated with the primary encode and a secondary cost associated with the secondary encode, (3) a quality metric (QM) module, included in the hardware video encoding pipeline, to determine a primary QM associated with the primary encode and a secondary QM associated with the secondary encode, and (4) a decision module, included in the hardware video encoding pipeline, to select at least one of the primary prediction mode and the secondary prediction mode based on the primary cost, the secondary cost, the primary QM, and the secondary QM.

Example 20: The non-transitory computer-readable medium of example 19, wherein the computer-readable instructions further, when executed by the at least one processor of the computing system, cause the computing system to direct the decision module to further (1) select at least one of the primary prediction mode and the secondary prediction mode by storing the primary cost, the secondary cost, the primary QM, and the secondary QM within a data storage device accessible to the decision module, (2) receive, (a) from the RDO module, a test cost associated with a test prediction mode, and (b) from the QM module, a test QM associated with the test prediction mode, (3) determine that the test QM differs from the primary QM by less than the secondary QM differs from the primary QM, and (4) replace the secondary QM with the test QM and the secondary cost with the test cost based on determining that the test QM differs from the primary QM by more than a threshold QM value.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive video data to be transformed, transform the video data, output a result of the transformation to encode the video data, use the result of the transformation to present the encoded video data, and store the result of the transformation to later present the encoded video data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising a hardware video encoding pipeline, the hardware video encoding pipeline comprising:
 a prediction module that generates:
  using a primary prediction mode, a primary encode of a portion of a video stream; and
  using a secondary prediction mode, a secondary encode of the portion of the video stream;
 a rate-distortion optimization (RDO) module that determines a primary cost associated with the primary encode and a secondary cost associated with the secondary encode;
 a quality metric (QM) module that determines a primary QM associated with the primary encode and a secondary QM associated with the secondary encode; and
 a decision module that:
  comprises a hardware memory module included in the hardware video encoding pipeline;
  stores, within the hardware memory module, the primary QM, the secondary QM, the primary cost, and the secondary cost, and
  selects, for an encoding of the video stream, at least one of the primary prediction mode and the secondary prediction mode based on the primary cost, the secondary cost, the primary QM, and the secondary QM.

2. The system of claim 1, wherein the decision module selects at least one of the primary prediction mode and the secondary prediction mode by determining that the primary QM differs from the secondary QM by at least a QM threshold value.

3. The system of claim 2, wherein the QM module receives the QM threshold value via a programmable interface.

4. The system of claim 2, wherein the decision module further selects at least one of the primary prediction mode and the secondary prediction mode by determining that the primary cost differs from the secondary cost by less than a cost threshold value.

5. The system of claim 4, wherein the decision module receives the cost threshold value via a programmable interface.

6. The system of claim 1, wherein the decision module selects at least one of the primary prediction mode and the secondary prediction mode by storing the primary cost, the secondary cost, the primary QM, and the secondary QM within a data storage device accessible to the decision module.

7. The system of claim 6, wherein the decision module further:
 receives:
  from the RDO module, a test cost associated with a test prediction mode; and
  from the QM module, a test QM associated with the test prediction mode;
 determines that the test QM differs from the primary QM by less than the secondary QM differs from the primary QM; and
 replaces the secondary QM with the test QM and the secondary cost with the test cost based on determining that the test QM differs from the primary QM by more than a threshold QM value.

8. The system of claim 1, wherein the QM comprises at least one of:
 a structural similarity index measure (SSIM);
 a multi-scale SSIM;
 an overall peak signal-to-noise ratio (PSNR);
 an averaged PSNR;
 a variance inflation factor (VIF);
 a motion-based video integrity evaluation (MOVIE) index;
 a naturalness image quality evaluator (NIQE);
 a video multimethod assessment fusion (VMAF); or
 a blind/referenceless image spatial quality evaluation (BRISQUE).

9. The system of claim 1, wherein the primary prediction mode and the secondary prediction mode are included in a set of prediction modes supported by a video encoding standard, the video encoding standard comprising at least one of:
 an Advanced Video Coding (AVC)/H.264 video encoding standard;
 a High Efficiency Video Coding (HEVC)/H.265 video encoding standard;
 a VP9 video encoding standard; or
 an AOMedia Video 1 (AV1) video encoding standard.

10. The system of claim 1, wherein at least one of the primary prediction mode and the secondary prediction mode comprises an inter prediction partition mode.

11. The system of claim 1, wherein at least one of the primary prediction mode and the secondary prediction mode comprises an intra prediction mode.

12. The system of claim 1, wherein at least one of the primary prediction mode and the secondary prediction mode comprises at least one of:
 a luma prediction mode; or
 a chroma prediction mode.

13. A computer-implemented method comprising:
 generating, by a prediction module included in a hardware video encoding pipeline:
  using a primary prediction mode, a primary encode of a portion of a video stream; and
  using a secondary prediction mode, a secondary encode of a portion of a video stream;
 determining, by a rate-distortion optimization (RDO) module included in the hardware video encoding pipeline, a primary cost associated with the primary encode and a secondary cost associated with the secondary encode;
 determining, by a quality metric (QM) module included in the hardware video encoding pipeline, a primary QM associated with the primary encode and a secondary QM associated with the secondary encode; and
 by a decision module included in the hardware video encoding pipeline and comprising a hardware memory module:
  storing, within the hardware memory module, the primary QM, the secondary QM, the primary cost, and the secondary cost; and
  selecting, for encoding of the video stream, at least one of the primary prediction mode and the secondary prediction mode based on the primary cost, the secondary cost, the primary QM, and the secondary QM.

14. The computer-implemented method of claim 13, wherein selecting at least one of the primary prediction mode and the secondary prediction mode comprises determining that the primary QM differs from the secondary QM by at least a QM threshold value.

15. The computer-implemented method of claim 14, further comprising receiving the QM threshold value via a programmable interface.

16. The computer-implemented method of claim 14, wherein selecting at least one of the primary prediction mode and the secondary prediction mode comprises determining that the primary cost differs from the secondary cost by less than a cost threshold value.

17. The computer-implemented method of claim 16, further comprising receiving the cost threshold value via a programmable interface.

18. The computer-implemented method of claim 13, further comprising:
  receiving:
    from the RDO module, a test cost associated with a test prediction mode; and
    from the QM module, a test QM associated with the test prediction mode;
  determining that the test QM differs from the primary QM by less than the secondary QM differs from the primary QM; and
  replacing the secondary QM with the test QM and the secondary cost with the test cost based on determining that the test QM differs from the primary QM by more than a threshold QM value.

19. A non-transitory computer-readable medium comprising computer-readable instructions that, when executed by at least one processor of a computing system, cause the computing system to direct:
  a prediction module, included in a hardware video encoding pipeline, to generate,
    using a primary prediction mode, a primary encode of a portion of a video stream; and
    using a secondary prediction mode, a secondary encode of the portion of the video stream;
  a rate-distortion optimization (RDO) module, included in the hardware video encoding pipeline, to determine a primary cost associated with the primary encode and a secondary cost associated with the secondary encode;
  a quality metric (QM) module, included in the hardware video encoding pipeline, to determine a primary QM associated with the primary encode and a secondary QM associated with the secondary encode; and
  a decision module, included in the hardware video encoding pipeline and comprising a hardware memory module, to:
    store, within the hardware memory module, the primary QM, the secondary QM, the primary cost, and the secondary cost; and
    select, for encoding of the video stream, at least one of the primary prediction mode and the secondary prediction mode based on the primary cost, the secondary cost, the primary QM, and the secondary QM.

20. The non-transitory computer-readable medium of claim 19, wherein the computer-readable instructions further, when executed by the at least one processor of the computing system, cause the computing system to direct the decision module to further
  receive:
    from the RDO module, a test cost associated with a test prediction mode; and
    from the QM module, a test QM associated with the test prediction mode;
  determine that the test QM differs from the primary QM by less than the secondary QM differs from the primary QM; and
  replace the secondary QM with the test QM and the secondary cost with the test cost based on determining that the test QM differs from the primary QM by more than a threshold QM value.

* * * * *